(12) United States Patent
Yoshida et al.

(10) Patent No.: US 8,674,287 B2
(45) Date of Patent: Mar. 18, 2014

(54) ENCODER, OPTICAL MODULE AND SERVO SYSTEM INCLUDING PLURAL LIGHT RECEIVING ELEMENTS HAVING RESPECTIVE SHAPES WITH RESPECT TO A POINT LIGHT SOURCE

(75) Inventors: Yasushi Yoshida, Kitakyushu (JP); Shirou Yoshidomi, Kitakyushu (JP); Yasuhiro Matsutani, Kitakyushu (JP); Jiro Muraoka, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 232 days.

(21) Appl. No.: 13/368,340

(22) Filed: Feb. 8, 2012

(65) Prior Publication Data

US 2012/0205527 A1 Aug. 16, 2012

Related U.S. Application Data

(60) Provisional application No. 61/499,650, filed on Jun. 21, 2011.

(30) Foreign Application Priority Data

Feb. 10, 2011 (JP) ................................ 2011-027255

(51) Int. Cl.
*G01D 5/34* (2006.01)
(52) U.S. Cl.
USPC ....................................... 250/231.13; 250/239
(58) Field of Classification Search
USPC ............. 250/231.13, 231.14, 231.16, 231.18, 250/214 PR, 239; 341/11, 13
See application file for complete search history.

(56) References Cited

U.S. PATENT DOCUMENTS

| 4,465,928 A * | 8/1984 | Breslow .................... 250/231.18 |
| 5,563,408 A | 10/1996 | Matsumoto et al. |
| 2003/0076507 A1 | 4/2003 | Ito |
| 2004/0007664 A1 | 1/2004 | Mitchell |

FOREIGN PATENT DOCUMENTS

| EP | 1154242 | 11/2001 |
| JP | 2003-130689 | 5/2003 |
| JP | 2009-168625 | 7/2009 |

OTHER PUBLICATIONS

Extended European Search Report for corresponding EP Application No. 12154674.1-2208, Feb. 5, 2013.

* cited by examiner

*Primary Examiner* — Que T Le
(74) *Attorney, Agent, or Firm* — Ditthavong Mori & Steiner, P.C.

(57) ABSTRACT

An encoder includes a slit array along a first measurement axis, and an optical module capable of relatively moving with respect to the slit array. The optical module comprises a point light source that irradiates the part of the slit array, and a light receiving array comprising a plurality of light receiving elements along a second measurement axis and arranged in positions offset with respect to the point light source. The light receiving elements is receiving light irradiated from the point light source and reflected from the reflection slit. The plurality of light receiving elements comprises respective shapes such that the light receiving element nearer to the point light source comprises a shorter length in a width direction and end parts on an opposite side of the light receiving element with respect to the point light source are arranged side by side in positions along the second measurement axis.

7 Claims, 6 Drawing Sheets

US 8,674,287 B2

ENCODER, OPTICAL MODULE AND SERVO SYSTEM INCLUDING PLURAL LIGHT RECEIVING ELEMENTS HAVING RESPECTIVE SHAPES WITH RESPECT TO A POINT LIGHT SOURCE

CROSS-REFERENCE TO RELATED APPLICATION

The present application claims priority from Provisional Application No. 61/499,650, which was filed on Jun. 21, 2011, the disclosure of which is incorporated herein by reference in its entirety.

BACKGROUND OF THE INVENTION

1. Field of the Invention

The present invention relates to an encoder, an optical module, and a servo system.

2. Description of the Related Art

As an optical encoder, a reflective encoder has been known as, for example, in JP, A, 2003-130689. In the reflective encoder, a point light source is used. Irradiation light from the light source is reflected by a reflection slit. The reflection light is received by a light receiving element. Then, the position of an object to be detected is detected from the light reception signal.

SUMMARY OF THE INVENTION

According to an aspect of the present invention, there is provided an encoder comprising:

a slit array comprising a plurality of reflection slits arranged side by side along a first measurement axis; and an optical module capable of relatively moving on the first measurement axis with respect to the slit array while facing part of the slit array, the optical module comprising:

a point light source that irradiates the part of the slit array with light; and a light receiving array comprising a plurality of light receiving elements arranged side by side along a second measurement axis and arranged in positions offset with respect to the point light source in a width direction perpendicular to the second measurement axis corresponding to the first measurement axis in a plane parallel to the slit array, the light receiving elements being respectively receiving light irradiated from the point light source and reflected from the reflection slit, and the plurality of light receiving elements comprises respective shapes such that the light receiving element nearer to the point light source in the second measurement axis direction comprises a shorter length in the width direction and end parts on an opposite side of the light receiving element with respect to the point light source in the width direction are arranged side by side in positions along the second measurement axis.

According to another aspect of the present invention, there is provided an optical module that configures an encoder when arranged so as to be capable of relatively moving on a first measurement axis with respect to a slit array while facing part of the slit array comprising a plurality of reflection slits arranged side by side along the first measurement axis, the optical module comprising:

a point light source that irradiates the part of the slit array with light; and a light receiving array comprising a plurality of light receiving elements arranged side by side along a second measurement axis and arranged in positions offset with respect to the point light source in a width direction perpendicular to the second measurement axis corresponding to the first measurement axis in a plane parallel to the slit array, the light receiving elements being respectively receiving light irradiated from the point light source and reflected from the reflection slit, wherein the plurality of light receiving elements comprises respective shapes such that the light receiving element nearer to the point light source in the second measurement axis direction comprises a shorter length in the width direction and end parts on an opposite side of the light receiving element with respect to the point light source in the width direction are arranged side by side in positions along the second measurement axis.

According to another aspect of the present invention, there is provided a servo system comprising:

a motor capable of moving an object to be moved in a first measurement axis direction;

an encoder that detects a position of at least one of the motor and the object to be moved, in the first measurement axis direction; and a controller that controls the motor based on the position detected by the encoder, the encoder including:

a slit array in which a plurality of reflection slits arranged side by side along the first measurement axis; and an optical module capable of relatively moving on the first measurement axis with respect to the slit array by a drive of the motor while facing part of the slit array, the optical module comprising:

a point light source that irradiates the part of the slit array with light; and a light receiving array comprising a plurality of light receiving elements arranged side by side along a second measurement axis and arranged in positions offset with respect to the point light source in a width direction perpendicular to the second measurement axis corresponding to the first measurement axis in a plane parallel to the slit array, the light receiving elements being respectively receiving light irradiated from the point light source and reflected from the reflection slit, and the plurality of light receiving elements comprises respective shapes such that the light receiving element nearer to the point light source in the second measurement axis direction comprises a shorter length in the width direction and end parts on an opposite side of the light receiving element with respect to the point light source in the width direction are arranged side by side in positions along the second measurement axis.

DESCRIPTION OF THE EMBODIMENTS

Figure 1:
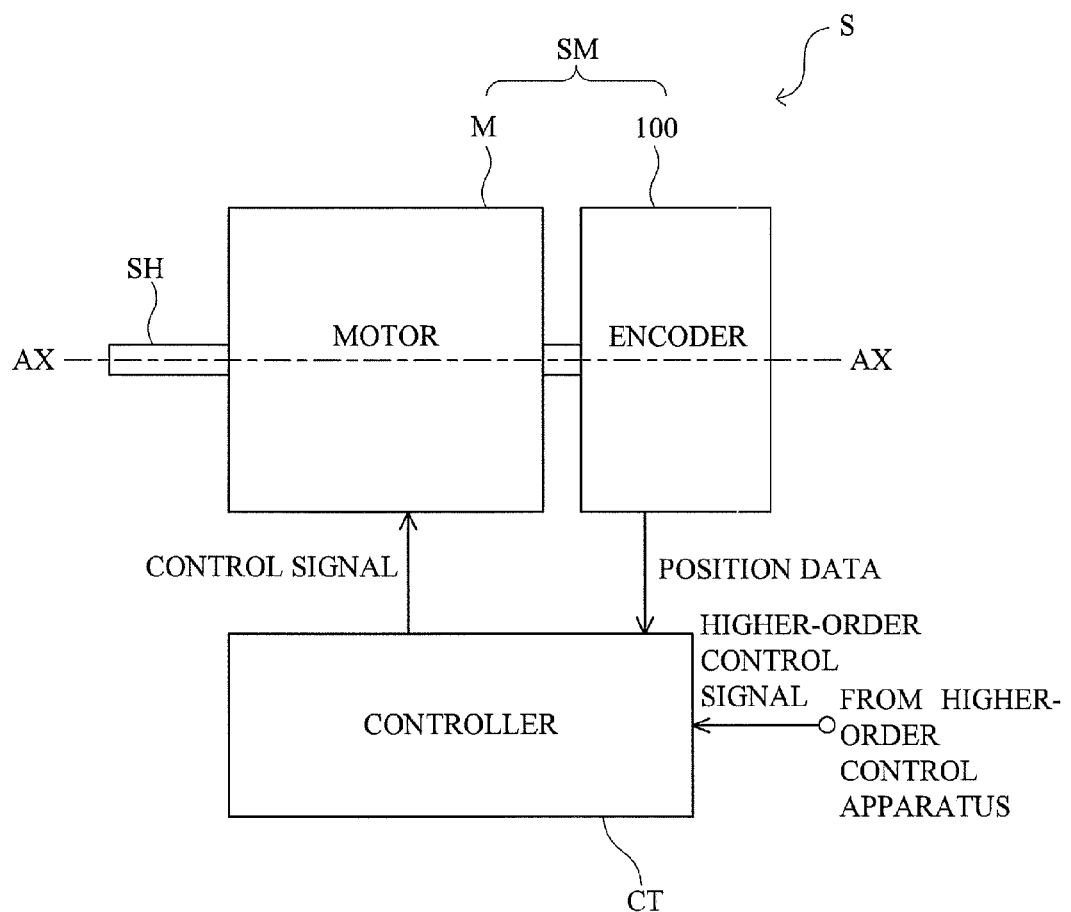
FIG. 1 is an explanatory diagram for explaining a servo system of an embodiment of the disclosure.

Hereinafter, embodiments of the disclosure are explained in detail with reference to the accompanying drawings. In the present specification and drawings, components having substantially the same function are denoted by the same symbol as a general rule. Then, duplicated explanation of these components is omitted appropriately.

Before the explanation of each embodiment, causes of noise etc. the inventors of the present application have thought out as a result of assiduous intensive research are explained.

When a point light source is used as in the encoder according to each embodiment of the disclosure, the diffusion light irradiated from the light source has comparatively high straightness. In this case, reflection light, which is diffusion light having high straightness reflected by a reflection slit, is detected. As a result of this, it is possible to reduce noise and improve detection precision. However, diffusion light is scattered by another member in the vicinity of the point light source, for example, a member protruding to the side of an object to be irradiated. As a result of this, there may be a case where the scattered light reaches a light receiving element. In particular, in a point light source using an LED (Light Emitting Diode), a bonding wire etc. to supply electric power protrudes in a light path or in the vicinity of the light path. Scattered light by the wire is also a cause of noise. Further, even in a point light source having another configuration, scattering is also caused by its wiring or another member, which is a cause of noise. Consequently, it can be conceived that the arrangement position of a wire etc. is separated from a light path by devising. However, even in this case, irradiation light etc. outside a desired light path is scattered by a wire, resulting in the occurrence of noise. Further, the secondary reflection of scattered light, the secondary reflection of reflection light, etc., are causes of noise. If such noise occurs, the noise reduction effect by the use of a point light source having comparatively high straightness is cancelled out. Alternatively, there is a case where noise increases on the contrary.

On the other hand, the main source from which the noise light originates is a point light source, and therefore, the above-mentioned noise is attenuated with the increasing distance from the point light source. Consequently, it can also be conceived that noise is reduced by increasing the distance between the point light source and the light receiving element. However, in this case, the encoder itself becomes large and at the same time, reflection light to be detected is also attenuated as the above-mentioned noise. Consequently, it is difficult to achieve both downsizing of the apparatus and improvement of detection precision by reducing noise.

The inventors of the present application have thought out the encoder etc. according to each embodiment as a result of research. Hereinafter, each embodiment is explained in detail.

The encoder according to each embodiment to be explained below can be applied to various types of encoder, such as a rotary type and linear type. In each embodiment to be explained below, explanation is given with the rotary encoder as an example for easier understanding. However, it is also possible to apply the encoder to another type of encoder by appropriately changing the moving body from the rotary type to a linear type etc. Consequently, in the following, detailed explanation of the application to another type of encoder is omitted.

Embodiment

1. Servo System

First, with reference to FIG. 1, a configuration of a servo system according to an embodiment is explained. FIG. 1 is an explanatory diagram of a servo system according to an embodiment.

As shown in FIG. 1, a servo system S according to the present embodiment has a servo motor SM and a controller CT. The servo motor SM has an encoder 100 and a motor M.

The motor M is an example of a power generation source not including the encoder 100. The motor M alone is sometimes referred to as a servo motor, but, in the present embodiment, the configuration including the encoder 100 is referred to as the servo motor SM. The motor M has a shaft SH, which is an example of a moving body. The motor M outputs a rotational force by rotating the shaft SH around a rotation axis AX.

The motor M is not limited in particular as long as it is a motor controlled based on data detected by the encoder 100, for example, such as position data. Further, the motor M is not limited to an electric motor that uses electricity as a power source and it may be a motor that uses, for example, another power source, such as a hydraulic motor, an air motor, and a steam motor. However, for the sake of convenience of explanation, in the following, a case is explained where the motor M is an electric motor.

The encoder 100 according to the present embodiment is connected to the shaft SH on the opposite side of the rotational force output side of the motor M. Then, the encoder 100 detects a position x (also referred to as a rotation angle θ) of the motor M (an example of an object to be measured) by detecting the position (angle) of the shaft SH and outputs position data representing the position x.

It may also be possible for the encoder 100 to detect at least one of a velocity v of the motor M (also referred to as rotation velocity, angular velocity, etc.) and an acceleration a of the motor M (also referred to as rotation acceleration, angular acceleration, etc.) in addition to the position x of the motor M (or in place of the position x). In this case, it is possible to detect the velocity v and the acceleration a of the motor M by, for example, obtaining the first derivative (or the second derivative) of the position x with respect to time or by processing to count a detection signal (for example, an incremental signal, to be described later) for a predetermined period of time. For the sake of convenience of explanation, in the following, explanation is given with an example in which the physical quantity detected by the encoder 100 is the position x.

The controller CT acquires position data output from the encoder 100. The controller CT controls the rotation of the motor M based on the acquired position data. Consequently, in the present embodiment in which an electric motor is used as the motor M, the controller CT controls a current or voltage to be applied to the motor M based on position data. As a result of this, the rotation of the motor M is controlled. Further, it is also possible for the controller CT to control the motor M by acquiring a higher-order control signal from a higher-order control apparatus (not shown schematically). In this case, the motor M is controlled so that a rotational force capable of realizing a position etc. represented by the higher-order control signal is output from the shaft SH. There is also a case where the motor M uses another power source, such as a hydraulic power source, an air power source, and a steam power source. In such a case, it is possible for the controller CT to control the rotation of the motor M by controlling the supply from those power sources.

2. Encoder

Figure 2:
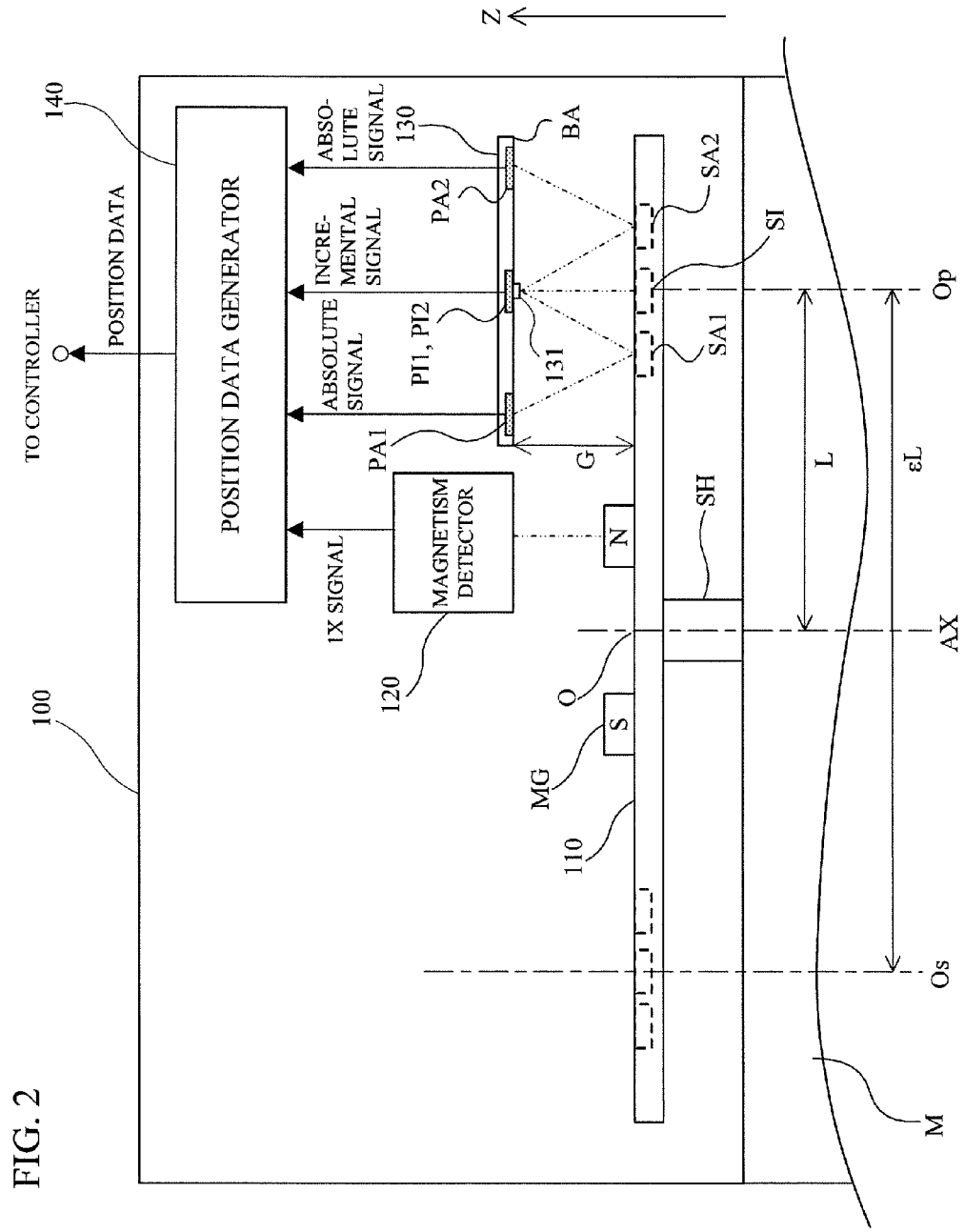
FIG. 2 is an explanatory diagram for explaining an encoder of the embodiment of the disclosure.
Figure 3:
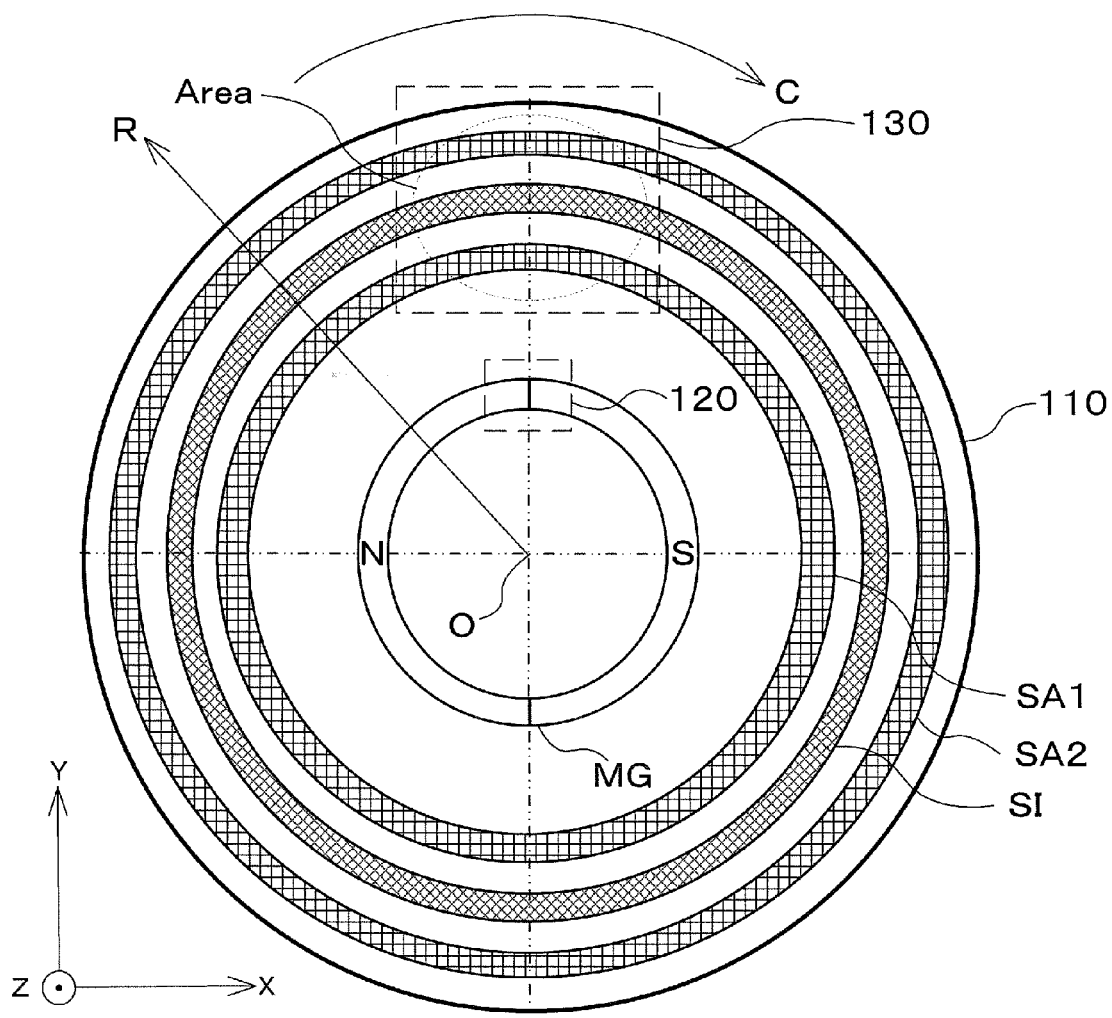
FIG. 3 is an explanatory diagram for explaining a disc provided in the encoder of the embodiment of the disclosure.
Figure 4:
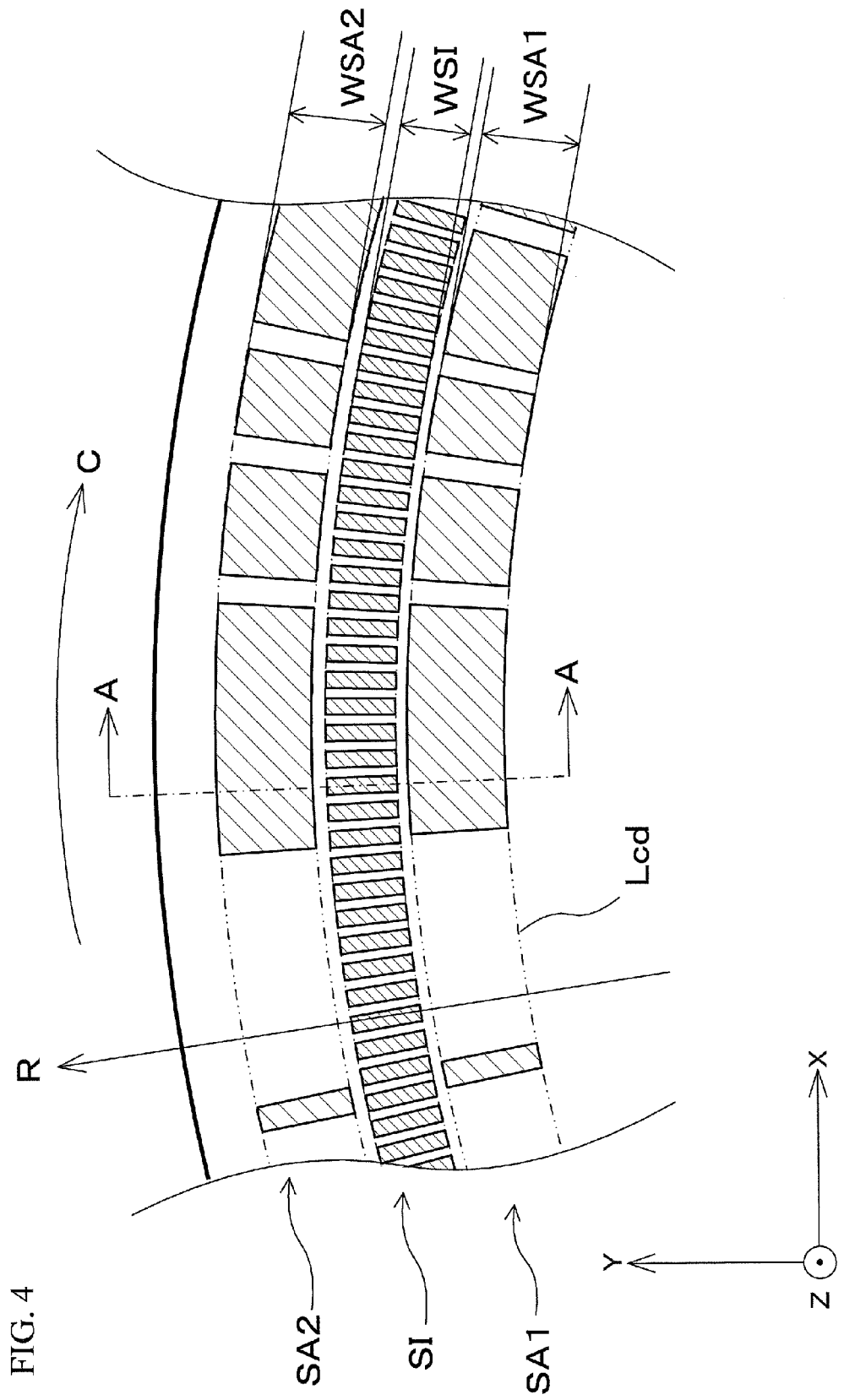
FIG. 4 is an explanatory diagram for explaining a slit array provided in the encoder of the embodiment of the disclosure.
Figure 5:
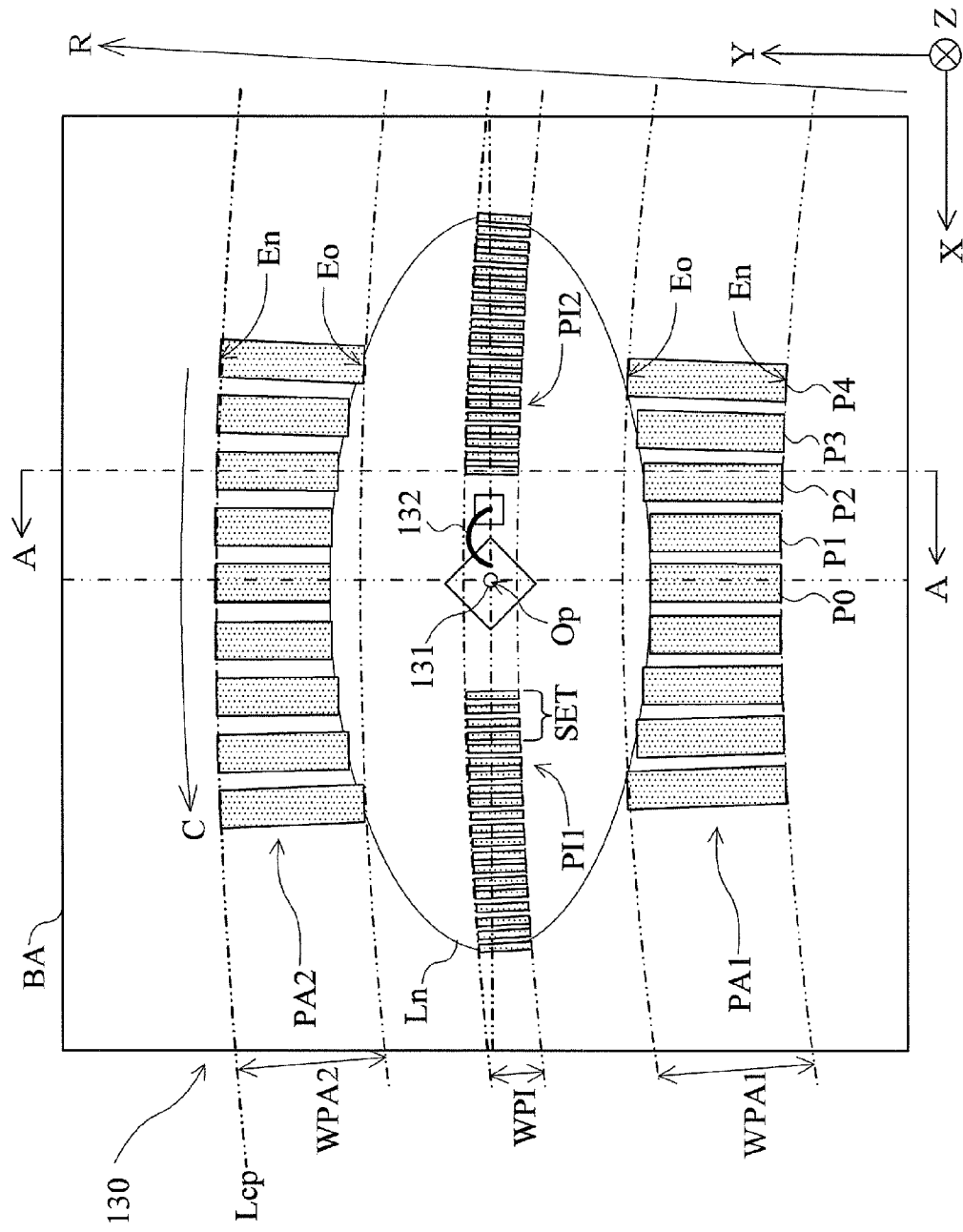
FIG. 5 is an explanatory diagram for explaining an optical module and a light receiving array provided in the encoder of the embodiment of the disclosure.
Figure 6:
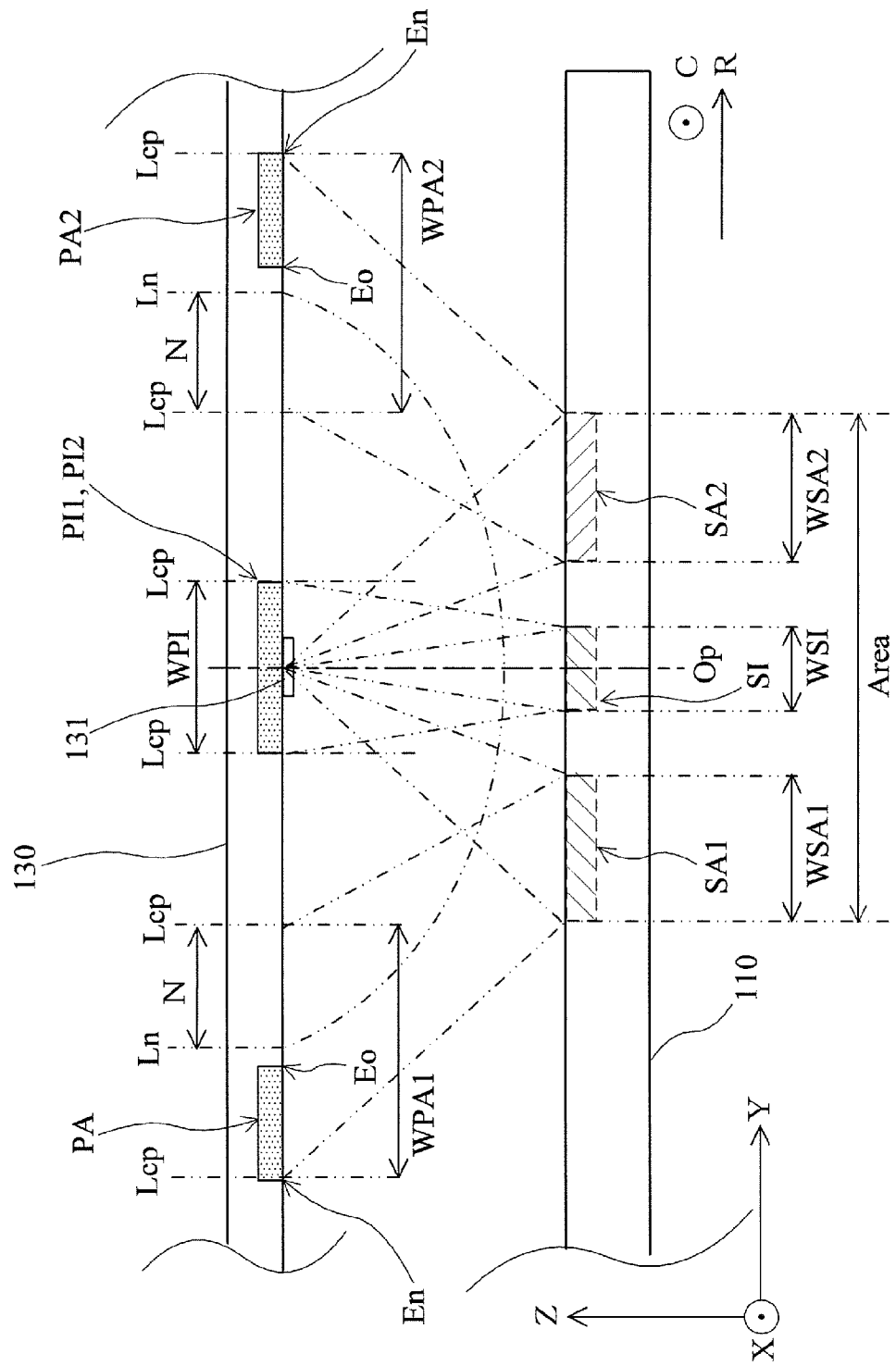
FIG. 6 is an explanatory diagram for explaining a light receiving operation by an optical detecting mechanism provided in the encoder of the embodiment of the disclosure.

With reference to FIG. 2 to FIG. 6, the encoder 100 according to the present embodiment is explained below. FIG. 2 is an explanatory diagram of the encoder of the present embodiment. FIG. 3 is an explanatory diagram of a disc provided in the encoder of the present embodiment. FIG. 4 is an explanatory diagram of a slit array provided in the encoder of the present embodiment. FIG. 5 is an explanatory diagram of an optical module provided in the encoder of the present embodiment. FIG. 6 is an explanatory diagram of a light receiving operation by the encoder of the present embodiment. FIG. 6 is a schematic diagram showing a section along A-A line in FIG. 4 and FIG. 5.

As shown in FIG. 2, the encoder 100 according to the present embodiment has a disc 110, a magnet MG, a magnetism detector 120, an optical module 130, and a position data generator 140.

Here, for the sake of convenience of explanation of a structure of the encoder 100, in the present embodiment, directions, such as the vertical direction, are defined as follows. In FIG. 2, the direction in which the disc 110 faces the optical module 130, that is, the positive direction along the Z axis is referred to as "upward" and the opposite direction, that is, the negative direction along the Z axis is referred to as "downward". In FIG. 3, the radial direction of the disc 110 is also referred to as a "width R" direction, which means the width direction of a track formed by a slit array, to be described later. On the other hand, the direction of the circumference of the disc 110 is also referred to as a direction of a "measurement axis C", which means the direction of the position x measured by the encoder 100. However, the positional relation of each configuration of the encoder 100 according to the present embodiment is not limited in particular to the concept of the vertical direction etc. There may be cases where the directions defined as described above are represented differently other than these directions described above according to the convenience of explanation. Further, there may be cases where directions other than these directions are represented with appropriate definition thereof.

(2-1. Disc)

The disc 110 is formed into the shape of a circular plate as shown in FIG. 3. The disc 110 is arranged so that a disc center O substantially agrees with the rotation axis AX. Further, the disc 110 is connected to the shaft SH of the motor M. Then, the disc 110 is rotated by the rotation of the motor M, that is, the rotation of the shaft SH. In the present embodiment, explanation is given with the disc 110 in the shape of a circular plate as an example of an object to be measured (also referred to as a moving body) that measures the rotation of the motor M. However, it is also possible to use another member, for example, such as an end surface of the shaft SH, as an object to be measured.

The disc 110 has the magnet MG and a plurality of slit arrays SA1, SA2 and SI as shown in FIG. 3. The disc 110 rotates as the motor M is driven as described above. In contrast to this, the magnetism detector 120 and the optical module 130 are arranged fixedly while facing part of the disc 110. Consequently, it is possible for the magnet MG and the slit arrays SA1, SA2 and SI, the magnetism detector 120, and the optical module 130 to move with respect to each other along the measurement axis C direction as the motor M is driven. The measurement axis C corresponds to the first measurement axis according to each claim.

The magnetism detector 120 is arranged facing part of the magnet MG on the top surface side of the disc 110 and configures a magnetism detecting mechanism. The optical module 130 is arranged facing part of the slit arrays SA1, SA2 and SI on the top surface side of the disc 110 and configures an optical detecting mechanism. The magnetism detecting mechanism and the optical detecting mechanism are explained in detail.

(2-2. Magnetism Detecting Mechanism)

The magnetism detecting mechanism has the magnet MG and the magnetism detector 120. The magnet MG is formed into a ring shape with the disc center O as its center on the top surface (in the positive direction along the Z axis) of the disc 110 as shown in FIG. 3. The magnet MG is arranged so that the direction of the magnetic field is reversed on the top surface of the magnet MG in two regions of the disc 110 180° separate from each other.

As shown in FIG. 2 and FIG. 3, the magnetism detector 120 is arranged fixedly so as to be capable of relatively moving with respect to the rotating magnet MG in the position facing part of the ring-shaped magnet MG on the top surface side of the disc 110. Then, the magnetism detector 120 detects the direction of the magnetic field on the top surface of the magnet MG As described above, the direction of the magnetic field on the top surface of the magnet MG is reversed in two regions of the disc 110 180° separate from each other. As a result of this, the magnetism detector 120 detects the direction of the magnetic field that changes through one period during one rotation of the disc 110. That is, a signal detected by the magnetism detector 120 roughly represents the position x of the disc 110 during one rotation. In the following, this signal is also referred to as a "1× signal". This 1× signal is sent to the position data generator 140. It may also be possible for the magnetism detector 120 to detect a "multi-rotation signal" representing whether or not the disc 110 has made one rotation instead of detecting the 1× signal. The detection of the "multi-rotation signal" by the magnetism detector 120 is particularly effective, for example, for position detection by a backup power source during power OFF.

The magnetism detector 120 is not limited in particular as long as the configuration thereof is capable of detecting the direction of the magnetic field as described above. As an example of the magnetism detector 120, it is possible to use a magnetic angle sensor, for example, such as an MR (Magnetro Resistive effect) element and a GMR (Giant Magnetro Resistive effect) element. It is also possible to use a magnetic field detecting element, for example, such as a hall element, as the magnetism detector 120. In this case, it is possible to calculate the direction of the magnetic field of the magnet MG based on the detection signal from the magnetic field detecting element by detecting the intensities of the magnetic field along the directions of two axes perpendicular to the rotation axis AX, respectively, and thereby, the rotation of the disc 110 is detected.

It is desirable that the at least two magnetism detectors 120 be arranged in positions where the phases are 90° different during one rotation of the disc 110 in order to determine the direction of rotation. Further, in order to reduce the influence of the manufacture errors, such as decentering of the disc 110, it may also be possible to arrange the other magnetism detector 120 that makes a pair with the one magnetism detector 120 in positions where the phases are 180° different with respect to the one magnetic detector 120.

However, the magnetism detecting mechanism is not necessarily required. Nonetheless, when the magnetism detecting mechanism is provided as in the present embodiment, for example, it is possible for the encoder 100 to use both the magnetism detecting mechanism and the optical detecting mechanism. In this case, it is possible to calculate the highly reliable position x of the motor M, to give functional redundancy based on different principles, to detect a multi-rotation with low power consumption, etc.

(2-3. Optical Detecting Mechanism)

The optical detecting mechanism has the slit arrays SA1, SA2 and SI and the optical module 130. The slit array is formed as a track arranged in a ring shape with the disc center O as its center on the top surface (positive direction along the Z axis) of the disc 110. The slit array has a plurality of reflection slits (part hatched by slashes in FIG. 4) arranged side by side along the measurement axis C (that is, along the circumference direction) across the entire circumference of the track. Each reflection slit reflects light irradiated from a light source 131.

In the present embodiment, the disc 110 is formed by, for example, glass. Then, it is possible to form the reflection slit possessed by the slit array by applying a member that reflects light to the surface of the glass disc 110. The material of the disc 110 is not limited to glass and it is also possible to use a metal, resin, etc. It may also be possible to form the part the reflectance of which is reduced so as not to reflect light into the reflection slit by, for example, using a metal having a high reflectance as the disc 110. As a technique to reduce reflectance, there is a technique to turn the part into a coarse surface by sputtering etc. or to apply a material having a low reflectance. However, the material of the disc 110, the manufacturing method thereof, etc., are not limited in particular.

In the present embodiment, the three slit arrays are arranged side by side (the slit arrays SA1, SA2 and SI) in the width R direction (that is, in the radial direction) on the top surface of the disc 110. In order to explain the three slit arrays SA1, SA2 and SI, respectively, in more detail, an enlarged view of the part in the vicinity of an area Area in FIG. 3 is shown in FIG. 4.

As shown in FIG. 4, the slit array SA1 is arranged on the innermost side in the radial direction of the three slit arrays. On the other hand, the slit SA2 is arranged on the outermost side in the radial direction of the three slit arrays. Then, the slit array SI is arranged between the slit array SA1 and the slit array SA2.

The plurality of reflection slits possessed by the slit arrays SA1, SA2 arranged on both sides in the width R direction is arranged along the entire circumference of the disc 110 so as to have an absolute pattern in the measurement axis C direction.

The absolute pattern is a pattern in which the positions, proportion, etc., of the reflection slits within an angle in which the light receiving arrays of the optical module 130, to be described later, face each other are determined uniquely during one rotation of the disc 110. That is, when the motor M is located at the position x, a combination of detection or nondetection by each of the plurality of light receiving elements of the light receiving arrays face each other (on/off bit pattern by detection) uniquely represents the absolute value of the position x (absolute position) as a result. As a method for generating an absolute pattern, it is possible to use various algorithms. That is, the method is not limited in particular as long as the method can generate a pattern that one-dimensionally represents the absolute position of the motor M by bits in the number of light receiving elements of the light receiving array.

When the absolute position is represented by such an absolute pattern, in an area where the bit pattern by detection or nondetection of the light reception signal changes, the detection precision of the absolute position is reduced. Consequently, in the present embodiment, the two slit arrays SA1, SA2 are formed. The same absolute patterns as those described above of the these two slit arrays SA1, SA2, respectively are offset from each other by, for example, the length ½ of the one bit in the measurement axis C direction. The amount of offset is a value corresponding to, for example, half the pitch between the plurality of light receiving elements of the light receiving array, to be described later. As a result of this, in the encoder 100 of the present embodiment, the absolute position is calculated using the detection signal from the slit SA2 or the opposite operation is performed when, for example, the absolute position by the slit SA1 corresponds to the part where the bit pattern changes. As a result of this, it is possible to improve the detection precision of the absolute position. In the present embodiment, the respective absolute patterns of the slit arrays SA1, SA2 are offset against each other. However, it may also be possible to offset the light receiving arrays corresponding to the slit arrays SA1, SA2, respectively, against each other instead of offsetting the absolute patterns, for example.

On the other hand, a plurality of reflection slits possessed by the slit array SI arranged between the slit arrays SA1, SA2 is arranged along the entire circumference of the disc 110 so as to have an incremental pattern in the measurement axis C direction.

The incremental pattern is a pattern repeated regularly at a predetermined pitch as shown in FIG. 4. The function of the incremental pattern differs from that of the absolute pattern that represents the absolute position x by the bits corresponding to whether or not detected by the plurality of light receiving elements. That is, the incremental pattern represents the position of the motor M for each pitch or within one pitch by the sum of detection signals of at least one or more light receiving elements. Consequently, the incremental pattern does not represent the absolute position x of the motor M, but, can represent the position with very high precision compared to the absolute pattern.

As shown in FIG. 2 and FIG. 3, the optical module 130 is formed on a substrate BA parallel to the disc 110. Further, the optical module 130 is arranged so as to face part of the slit arrays SA1, SA2, and SI of the disc 100. Consequently, it is possible for the optical module to relatively move in the measurement axis C direction with respect to the slit arrays SA1, SA2 and SI accompanying the rotation of the disc 110. In the present embodiment, the optical module 130 is formed on the substrate BA so that the encoder 100 can be thinned or the manufacture thereof is made easy. However, the optical module 130 is not necessarily required to be provided on the substrate BA.

On the other hand, as shown in FIG. 2 and FIG. 5, the optical module 130 is provided on the surface of the substrate BA facing the optical disc 110. The optical module 130 has the light source 131, a wire 132, and light receiving arrays PA1, PA2, PI1 and PI2.

The light source 131 is arranged on the undersurface of the substrate BA (surface in the negative direction along the Z axis), that is, on the side facing the slit arrays. Then, the light source 131 irradiates the parts (for example, referred to as the area Area, "irradiation area") of the above-mentioned three slit arrays SA1, SA2 and SI passing through the positions facing the light source 131 with light.

The light source 131 is not limited in particular as long as it is a light source capable of irradiating the irradiation area with light. For example, it is possible to use an LED (Light Emitting Diode). Then, the light source 131 is particularly formed as a point light source in which no optical lens etc. is arranged and irradiates diffusion light from a light emitting unit. When referring to a point light source, the light source does not need to be strictly a point. Light may be emitted from a finite surface as long as the light source is regarded as a light source capable of emitting diffusion light from substantially a point-like position from the standpoint of design and operation principle. By using a point light source as described above, it is possible for the light source 131 to substantially uniformly irradiate the respective parts of the three slit arrays SA1, SA2 and SI passing through the positions facing thereto with diffusion light (however, there is a possibility that the influence of the change in the amount of light caused by the deviation from the optical axis, and attenuation caused by the optical path length difference, etc., exists to a certain extent). Further, collecting and diffusing of light by the optical element are not performed, and therefore, errors etc. by an optical element are unlikely to occur. As a result of this, it is possible to improve straightness of irradiation light toward the slit array.

The wire 132 connects between the light source 131 and the substrate BA and supplies electric power provided via the substrate BA to the light source 131. The wire 132 in the present embodiment protrudes from the undersurface of the substrate BA toward the top surface of the disc 110. The wire 132 is offset from the light emission surface of the light source 131 in the plane of the substrate BA. However, the wire 132 is irradiated with light emitted from the light source 131 and the irradiated light is scattered by the wire 132. Such scattered light causes noise against the light reception signal in the light receiving array of the optical module 130.

In the present embodiment, for the sake of convenience of explanation, the wire 132 is illustrated so that the cause of noise can be easily understood. However, the wire 132 that protrudes in such a manner is not necessarily required. Further, the source from which noise occurs is not limited to the wire 132. That is, as the source from which noise occurs, various causes are conceivable, such as scattering of light by those which protrude from the substrate BA, such as other structural members, multi-reflection of irradiation light, leaked light, etc.

The light receiving array is arranged on the surface on the side facing the slit array of the substrate BA and receives reflection light from the opposed slit array. Consequently, the light receiving array has a plurality of light receiving elements (parts hatched by dots, light receiving elements P0 to P4). The plurality of light receiving elements forming the light receiving array is arranged side by side along a measurement axis C' as shown in FIG. 5.

The shape of the measurement axis C' in the optical module 130 has the shape of the measurement axis C in the disc 110 projected onto the optical module 130. That is, the light receiving array receives light irradiated from the light source 131 and reflected by the slit array of the disc 110. At this time, the light irradiated from the light source 131 is diffusion light. Consequently, the image of the slit array projected onto the disc 110 is an image magnified by a predetermined magnifying power $\epsilon$ according to the optical path length as shown in FIG. 6. For example, it is assumed that the respective lengths of the slit arrays SA1, SA2 and SI in the width R direction are WSA1, WSA2 and WSI and the lengths of the shapes of the reflected light projected onto the optical module 130 in the width R direction are WPA1, WPA2 and WPAI. In this case, WSA1, WSA2 and WSI are $\epsilon$ times WPA1, WPA2 and WPI. Similarly, the shape of the measurement axis C' is also the shape of the measurement axis C affected by the magnifying power $\epsilon$ because it is projected onto the optical module 130. In order to make understanding easier, more specific explanation is given using the above-mentioned measurement axis C and the measurement axis C' corresponding to the position of the light source 131 as an example. The above-mentioned measurement axis C in the disc 110 is the circular shape with the rotation axis AX as a center. In contrast to this, because light is irradiated from the light source 131, the center of the above-mentioned measurement axis C' projected onto the optical module is located at a position separated from a reference, which is a center Op of the light source in a position within the plane of the disc 110 on which the light source 131 is arranged, by a distance $\epsilon L$, which is a apparent distance L between the rotation axis AX and the optical center Op magnified by the magnifying power $\epsilon$. This position is conceptually illustrated as a measurement axis Os in FIG. 2. Consequently, the measurement axis C in the disc 110 is on a line having the measurement axis Os separated by the distance $\epsilon L$ in the direction of the rotation axis AX from the optical center Op on a line on which the optical center Op and the rotation axis AX are located and the distance $\epsilon L$ as a radius.

In FIG. 4 and FIG. 5, the correspondence relation between the measurement axis C and the measurement axis C' is represented by lines Lcd, Lcp in the shape of an arc. The line Lcd shown in FIG. 4 represents a line along the measurement axis C on the disc 110. The line Lcp shown in FIG. 5 represents a line, which is the line Lcd reflected onto the optical module 130 and along the above-mentioned measurement axis C'. The measurement axis C' corresponds to the second measurement axis according to each claim.

For example, it is assumed that a gap length between the optical module 130 and the disc 110 is G and an amount of protrusion of the light source 131 from the substrate BA is $\Delta d$. In this case, the magnifying power $\epsilon$ is expressed by the following (formula 1).

$$\epsilon = (2G - \Delta d)/(G - \Delta d) \tag{formula 1}$$

As each light receiving element, it is possible to use, for example, a PD (Photodiode). However, the light receiving element is not limited to PD. Other kinds of light receiving element can be used as long as they are capable of receiving light emitted from the light source 131 and of converting the light into an electric signal.

In the present embodiment, the three light receiving arrays, that is, the light receiving array PA1, the receiving array PA2, and the receiving arrays PI1 and PI2 are arranged in correspondence to the three slit arrays SA1, SA2 and SI. The light receiving array PA1 corresponds to the slit array SA1. The light receiving array PA2 corresponds to the slit array SA2. The light receiving arrays PI1, PI2 correspond to the slit array SI. The light receiving arrays PI1, PI2 are not continuous on the way, but, they are arranged on the same track (that is, on the same circumference). Consequently, it is possible to use the light receiving arrays PI1, PI2 substantially as one light receiving array. Further, the number of light receiving arrays corresponding to one slit array is not limited to one and a plurality of light receiving arrays may be arranged corresponding to one slit array.

Each of the light receiving arrays PA1, PA2 corresponding to the absolute pattern has nine light receiving elements in the present embodiment. In each light receiving element, whether or not light is received is handled as a bit, as described above. As a result of this, it is possible for the nine light receiving elements to represent the absolute position x of nine bits in total. Consequently, a light reception signal received by each light receiving element is handled independently of one another in the position data generator 140 and encrypted (coded) into a serial bit pattern. By decoding the combination of the encrypted light reception signals, the absolute position x is acquired. The light reception signal of the light receiving arrays PA1, PA2 is also referred to as "absolute signal" appropriately in the following.

Each of the light receiving arrays PI1, PI2 corresponding to the incremental pattern has a plurality of light receiving elements arranged on the line Lcp corresponding to the same slit array SI. First, the light receiving array is explained using the light receiving array PI1 as an example.

In the present embodiment, in one pitch (one pitch in the projected image) of the incremental pattern, sets (SET) each including four light receiving elements are arranged side by side. The sets of light receiving elements are arranged side by side along the measurement axis C' in plural in number. In the incremental pattern, a reflection slit is formed repeatedly at one pitch. Consequently when the disc 110 is rotated, each light receiving element generates a periodic signal of one period (referred to 360° in terms of electric angle) in one pitch. Then, in one set corresponding to one pitch, four light receiving elements are arranged. Then, the light receiving elements of the four light receiving elements adjacent to each other in one set detect periodic signals having a phase difference of 90° from each other. In the following, the above-mentioned four light reception signals are referred to as an A-phase signal, a B-phase signal (phase difference from the A-phase signal is 90°), an inverted A-phase signal (phase difference from the A-phase signal is 180°), and an inverted B-phase signal (phase difference from the B-phase signal is 180°).

The incremental pattern represents a position in one pitch. Consequently, the signal in each phase in a certain one set and the signal in each phase in another set corresponding thereto have values that change in the same manner. Consequently, the signals in the same phase are added in a plurality of sets. Consequently, from a number of light receiving elements of the light receiving array PI1 shown in FIG. 5, four signals the phases of which are shifted by 90° from one another are detected. On the other hand, the light receiving array PI2 also includes that same configuration as that of the light receiving array PI1. Consequently, from the light receiving arrays PI1, PI2, four signals the phases of which are shifted by 90° are generated. In the following, the four signals are also referred to as an "incremental signal".

In the present embodiment, in one set corresponding to one pitch of the incremental pattern, four light receiving elements are included. Further, each of the light receiving array PI1 and the light receiving array PI2 has a plurality of the same sets. However, the number of light receiving elements in one set is not limited in particular. It may also be possible for the light receiving array PI1 and the light receiving array PI2 to acquire light reception signals in different phases.

The outline of the light receiving array is explained as above. Before the detailed configuration of each light receiving array is explained, the position data generator 140 is explained.

(2-4. Position Data Generator)

The position data generator 140 acquires the 1× signal from the magnetism detector 120. Further, the position data generator 140 acquires two absolute signals each including the bit pattern representing the absolute position x and four incremental signals the phases of which are shifted by 90° from one another from the optical module 130. Then, the position data generator 140 calculates the absolute position x of the motor M represented by these signals based on the acquired signals. Then, the position data generator 140 outputs position data representing the calculated position x to the controller CT.

As the method for generating position data by the position data generator 140, various methods can be used and not limited in particular. Here, a case is explained as an example, where the absolute position x is calculated from the incremental signal and the absolute signal and position data is generated.

The position data generator 140 acquires the incremental signal and the absolute signal at a timing to measure the position x of the motor M.

Then, the position data generator 140 first binarizes each absolute signal and converts the signal into bit data representing the absolute position x. Then, the position data generator 140 specifies the absolute position x based on the correspondence relation between predefined bit data and the absolute position x. It is possible for the position data generator 140 to selectively use either of the bit data of the light receiving array PA1 and the light receiving array PA2 the change points of bit patterns of which are shifted and the bit data of the light receiving array PA2. As a result of this, it is possible to avoid the influence of the change point of the above-mentioned bit pattern when specifying the absolute position x. Consequently, it is possible for the encoder 100 according to the present embodiment to specify the absolute position x from the absolute signal with higher precision.

On the other hand, the position data generator 140 performs subtraction on the incremental signals the phase difference between which is 180° of the incremental signals in four phases. By performing subtraction on the signals the phase difference between which is 180°, it is possible to cancel out the manufacture errors and measurement errors of the reflection slit in one pitch. As described above, the signals resulting from the subtraction are referred to here as a first incremental signal and a second incremental signal. The first incremental signal and the second incremental signal have a phase difference of 90° from each other in terms of electric angle (simply referred to as A-phase signal, B-phase signal, etc.). Then, the position data generator 140 specifies a position of particularly high precision within one pitch from the two signals. The method for specifying a position within one pitch is not limited in particular. For example, when the incremental signal, which is a periodic signal, is a sinusoidal signal, as an example of the above-mentioned method, there is a method for calculating an electric angle φ by performing the arc tangent operation on the result of division of the two sinusoidal signals in the A phase and B phase. Further, there is also a method for converting two sinusoidal signals into an electric angle φ using a tracking circuit. Furthermore, there is also a method for specifying an electric angle φ associated with values of signals in the A phase and B phase in a table created in advance, etc. At this time, it is preferable for the position data generator 140 to analog-to-digital convert the two sinusoidal signals in the A phase and B phase for each detection signal. Then, the position data generator 140 generates the position data after improving resolution by performing multiplication processing on the above-mentioned two converted digital signals.

Then, the position data generator 140 combines the absolute position x of comparatively low precision by the absolute signal and the position within one pitch of high precision by the incremental signal. As a result of this, position data representing the absolute position x of high precision is generated 3. Detailed Configuration of Light Receiving Array The detailed configuration of the light receiving array is explained next.

(3-1. Arrangement Position of Light Receiving Array)

In the encoder 100 according to the present embodiment, the light source 131, the light receiving arrays PA1, PA2 for absolute signal, and the light receiving arrays PI1, PI2 for incremental signal are arranged in the positional relation shown in FIG. 5.

The light receiving arrays PA1, PA2 for absolute signal are arranged in the positions offset in directions different from each other in the width R direction from the point light source 131 in the plane of the substrate BA parallel to the slit arrays SA1, SA2 as shown in FIG. 5 and FIG. 6. Then, the plurality (nine each in the present embodiment) of light receiving elements possessed by the light receiving arrays PA1, PA2 is arranged side by side at an equal pitch along the above-mentioned measurement axis C' (more accurately, along the line Lcp), respectively. Consequently, in the group of light receiving elements of each of the light receiving arrays PA1, PA2, reflection light from the slit arrays SA1, SA2, respectively, is received. As a result of this, the absolute signal having the bit patterns in the number of light receiving elements is generated in the group of light receiving elements of each of the light receiving arrays PA1, PA2. On the other hand, the light receiving arrays PI1, PI2 for incremental signal are arranged on one side and the other side, that is, on both sides of the point light source 131 in the measurement axis C' direction in the plane of the substrate BA parallel to the slit array SI as shown in FIG. 5 and FIG. 6. In other words, the light source 131 is arranged in the position sandwiched by the light receiving arrays PA1, PA2 for absolute signal arranged side by side in the width R direction. Further, the light source 131 is arranged in the position between the light receiving arrays PI1, PI2 for incremental signal arranged as one track in the measurement axis C' direction.

The encoder 100 according to the present embodiment has the light source 131 and each light receiving array in such a positional relation. As a result of this, it is possible to achieve both downsizing and high precision by effectively utilizing the area of the reflection slit reached by reflection light while very efficiently suppressing the influence of noise.

The working, effect, etc., of the above-mentioned arrangement are explained more specifically. The absolute signal is binarized in the position data generator 140. Then, the signal from each light receiving element is in charge of each bit in the bit data representing the absolute position x. Consequently, there is a case where the absolute position x is specified quite differently as a result of only erroneous detection caused by one light receiving element reached by noise. To the incremental signal, the detection signals of the plurality of light receiving elements in the same phase are added and from the incremental signal after the addition, a position within one pitch is generated. Consequently, even if noise occurs in one light receiving element, the noise is averaged. Therefore, the absolute signal is sensitive to noise and the incremental signal is insensitive to noise. On the other hand, in general, light is attenuated with the increasing optical path length. The amount of noise light in the encoder 100 of the present embodiment is also attenuated. Consequently the distribution of noise is a distribution in which noise is attenuated with the increasing distance from the light source 131 with the light source 131 as a center.

As described above, in the encoder 100 according to the present embodiment, the light source 131 is sandwiched between the light receiving arrays PI1, PI2 for incremental signal divided in the measurement axis C' direction. As a result of this, it is possible to arrange the light receiving arrays PI1, PI2 for incremental signal having high resistance to noise in close proximity to the light source 131 and to effectively make use of the area reached by reflection light. In order to only put the light receiving arrays for incremental signal closer to the light source, arranging them side by side in the width R direction can also be conceived. However, in this case, it is more difficult to effectively make use of the area on the same track as the light source (on the line Lcp in the same position in the width R direction) compared to the present embodiment.

Further, in the encoder 100 according to the present embodiment, the light receiving arrays PA1, PA2 for absolute signal having low resistance to noise are arranged side by side in the width R direction and the light source 131 is sandwiched therebetween. As a result of this, it is possible to set the separation distance from the light source 131 to the light receiving arrays PA1, PA2 to a distance at which the amount of noise light is reduced sufficiently. Further, at that time, it is possible to suppress to the maximum an increase in the area of the optical module 130. Consequently, according to the encoder 100, it is possible not only to reduce the size but also to prevent erroneous detection of the absolute position x by noise.

It is also conceivable to arrange side by side the light receiving array for incremental signal and the light receiving array for absolute signal in the width R direction while sandwiching the light source in between. However, with such a configuration, it is not possible to effectively make use of the finite light receiving area of reflection light compared to the present embodiment. That is, for example, when improving the precision of calculation of the absolute position x by arranging two light receiving arrays for absolute signal side by side, not only the optical module but also the disc itself is increased in size. Further, if the light receiving arrays for absolute signal are arranged side by side in the measurement axis C' direction with respect to the light source 131, the difference in the amount of received light between each light receiving element increases and at the same time, the influence of noise differs depending on the distance from the light source 131. Consequently, in this case, there is a possibility that the precision of calculation of the absolute position x is reduced or detection is no longer available as the case may be.

(3-3. Shape and Arrangement Position of Each Light Receiving Element)

On the other hand, in the encoder 100 according to the present embodiment, the light receiving arrays PA1, PA2 for absolute signal having low resistance to noise have light receiving elements in the shape that further suppresses the influence of noise and effectively makes use of the area. On the other hand, the light receiving arrays PA1, PA2 are arranged side by side so as to sandwich the light source 131 in between as described above. Then, the light receiving arrays PA1, PA2 are basically formed line-symmetrical about the line in the width R direction and the line in the measurement axis C' direction passing through the light source 131 as the symmetry lines (except for the bent shape with the measurement axis Os as a center). Here, explanation is given with the light receiving array PA1 as an example, and also the light receiving element arranged on the right in the light receiving array PA1 in FIG. 5 as an example.

As shown in FIG. 5, the plurality of light receiving elements possessed by the light receiving array PA1 has the lengths in the measurement axis C' direction (widths of the strips) substantially the same. On the other hand, the plurality of light receiving elements has the length in width R direction shorter for the light receiving element nearer to the light source 131 along the measurement axis C' direction. That is, when reference symbols P0 to P4 are attached to the light receiving elements in order from the light receiving element nearest to the light source 131, the lengths in the direction of the width R are in order of P0<P1<P2<P3<P4.

Further, as shown in FIG. 5, the plurality of light receiving elements possessed by the light receiving array PA1 is arranged side by side so that end parts En on the opposite side of the light source 131 in the width R direction are in positions along the measurement axis C' (that is, positions on the line Lcp). Consequently, end parts Eo of the plurality of light receiving elements on the side of the light source are arranged so as to describe substantially a circle or ellipse enclosing the light source 131 because the length of the light receiving element nearer to the light source 131 is shorter as shown in FIG. 5. Consequently, the plurality of light receiving elements of both the light receiving arrays PA1, PA2 is arranged in such a way that as if substantially a circle or ellipse with the light source 131 as a center were cut out so as to avoid the light source 131 with fixed distances in between (outside a line Ln).

In contrast to this, the plurality of light receiving elements possessed by the light receiving arrays PI1, PI2 is formed so as to have the same length in the width R direction. Further, the plurality of light receiving elements is arranged in close proximity to the light source 131 on the same line Lcp as the light source 131. Consequently, the plurality of light receiving elements of both the light receiving arrays PI1, PI2 is arranged in close proximity to the light source 131. Further, at least part of the plurality of light receiving elements of both the light receiving arrays PI1, PI2 is located in substantially the circle or ellipse that the light receiving arrays PA1, PA2 avoid when arranged (inside of the line Ln).

The encoder 100 according to the present embodiment has the plurality of light receiving elements having the above-mentioned shapes and arrangement positions. As a result of this, it is possible to downsize the apparatus itself while reducing the influence on the erroneous detection caused by noise. The working, effect, etc., are explained more specifically.

As described above, the intensity of noise emitted from the light source 131 and scattered by the wire 132 etc. is attenuated with the increasing distance from the light source 131. The limit position in which the intensity of noise becomes tolerable to the light receiving arrays PA1, PA2 for absolute signal is shown schematically by the line Ln in FIG. 5.

According to the encoder 100 according to the present embodiment, the light receiving arrays PA1, PA2 are arranged so as to avoid the light source 131 as described above. As a result of this, it is possible to arrange all the light receiving elements of the light receiving arrays PA1, PA2 outside the line Ln. Consequently, it is possible to reduce the possibility that erroneous detection occurs in the absolute position x by the absolute signal by reducing the noise of the light receiving arrays PA1, PA2 that receive the absolute signal. On the other hand, the end parts En of the plurality of light receiving elements of the light receiving arrays PA1, PA2 on the opposite side of the light source 131 are located on the line Lcp along the measurement axis C'. Consequently, it is possible for each of the light receiving arrays PA1, PA2 to receive reflection light from the slit arrays SA1, SA2 to the maximum.

Further, according to the present embodiment, the light receiving arrays PI1, PI2 for incremental signal having high resistance to noise are arranged in close proximity to the light source 131 so that at least part thereof is located within the line Ln. Consequently, it is possible to downsize the apparatus itself by minimizing the area of the optical module 130.

The lengths of the plurality of light receiving elements of the light receiving arrays PA1, PA2, respectively, which become shorter toward the light source 131, are set, respectively, in detail as follows. That is, the plurality of light receiving elements within the light receiving array PA1 and the plurality of light receiving elements within the light receiving array PA2 have substantially the same length in the measurement axis C' direction. In particular, the lengths of the plurality of light receiving elements within the light receiving array PA1 and the lengths of the plurality of light receiving elements within the light receiving array PA2 are formed so that the amount of received light is substantially the same. On the other hand, each light receiving element of the light receiving array PA1 and each light receiving element of the light receiving array PA2 have substantially the same length in the measurement axis C direction. In particular, the length of each light receiving element of the light receiving array PA1 and the length of each light receiving element of the light receiving array PA2 are formed so that the amount of received light is substantially the same between each light receiving element. As described above, in the encoder 100 according to the present embodiment, the lengths in the width R direction are set respectively so that the amount of received light of each light receiving element is uniform. Consequently, in addition to the working and effect described above, it is possible to prevent erroneous detection of the absolute position x by making uniform the detection precision of each bit.

4. Example of Effect by the Present Embodiment

As above, the encoder 100 etc. according to an embodiment of the disclosure are explained. Here, with reference to FIG. 6, the light receiving operation of the optical detecting mechanism of the encoder 100 is explained. Further, an example of the effect of the encoder 100 is also explained. FIG. 6 is an explanatory diagram of the light receiving operation of the encoder according to the present embodiment.

As shown in FIG. 6, in the encoder 100 according to the present embodiment, first, diffusion light is irradiated from the light source 131, which is a point light source, toward the irradiation area Area. Each of the plurality of reflection slits of the slit arrays SA1, SA2 and SI passing through the irradiation area Area reflects irradiation light toward the optical module 130.

The reflection light reflected by the slit array SI having the incremental pattern is detected by the light receiving arrays PI1, PI2. At this time, the light receiving arrays PI1, PI2 sandwich the light source 131 along the measurement axis C' direction and are arranged in close proximity to the light source 131 in an area where noise is relatively large (the side nearer to the light source 131 than the line Ln). Consequently, it is possible to very effectively make use of the area in the vicinity of the light source 131 of the optical module 130 while suppressing the influence of noise. As a result of this, the apparatus can be downsized.

On the other hand, reflection light reflected by the slit arrays PA1, PA2 having the absolute pattern reaches ranges the lengths of which in the width R direction are WPA1, WPA2 in the optical module 130 as shown in FIG. 5 and FIG. 6. However, the areas reached by reflection light are overlapped by the area where noise is relatively strong (the side nearer to the light source 131 than the line Ln). Consequently, in the encoder 100 according to the present embodiment, the end parts Eo of the light receiving arrays PA1, PA2 for absolute signal on the side of the light source 131 are arranged in the position nearest to the light source 131 in the width R direction and in the position that avoids an area N where noise is strong in the areas reached by reflection light. On the other hand, the end parts En of the light receiving arrays PA1, PA2 on the opposite side thereof are arranged in the position farthest from the light source 131 in the width R direction or in the vicinity thereof in the areas reached by reflection light. Consequently, it is possible for the encoder 100 according to the present embodiment to sufficiently suppress noise from being included in the absolute signal without increasing the size of the apparatus. At that time, it is possible for the encoder 100 to further receive an amount of light sufficient to detect the absolute position x. The end part En of each light receiving element on the opposite side of the light source 131 in the width R direction is arranged along the line Lcp corresponding to the measurement axis C so as to be along the area reached by reflection light as shown in FIG. 5. Because the end part En is along the line Lcp as described above, it is possible to sufficiently secure an amount of light and to minimize the optical module 130 in the width direction. If the end part En is inadvertently longer than the area reached by reflection light, noise outside the line Ln (noise weaker than that inside of the line Ln) is detected by the light receiving element, and therefore, the noise component becomes large. According to the present embodiment, it is also possible to reduce the influence of noise like this by arranging the end part En along the line Lcp.

The embodiments of the present disclosure have been explained in detail with reference to the accompanied drawings as above. However, the scope of the technical idea of the embodiment of the disclosure is not limited to the above-described contents. It is possible for persons having the ordinary knowledge in the field to which the embodiment of the disclosure belongs to further perform various alterations, modifications, and combinations on the above-described contents. Consequently, the techniques based on these alterations, modifications, and combinations should naturally be regarded to belong to the scope of the technical idea of the disclosure of the present application.

For example, in the embodiments described above, the case is explained where the two light receiving arrays PA1, PA2 for absolute signal are arranged with the light source 131 sandwiched in between. However, the embodiments are not limited to such an example. For example, it may also be possible to arrange either of the light receiving arrays PA1, PA2 for absolute signal or to arrange three or more light receiving arrays including the light receiving arrays PA1, PA2. Further, in the embodiments described above, the case is explained where each of the light receiving arrays PA1, PA2 has nine light receiving elements, but, the number of light receiving elements is not limited in particular.

In the embodiments described above, the case is explained where the light receiving arrays PA1, PA2 are light receiving arrays for absolute signal and the light receiving arrays PI1, PI2 are light receiving arrays for incremental signal. However, it is also possible to simply use at least one of the light receiving arrays PA1, PA2 as one for incremental signal.

In the embodiments described above, the case is explained where the light receiving arrays PA1, PA2 arranged in the positions offset from the light source 131 in the width R direction are light receiving arrays for absolute signal. However, the embodiments are not limited to such an example. The light receiving arrays PA1, PA2 may be, for example, a group of light receiving elements for the origin representing the position of the origin by the detection signal from each light receiving element. In this case, the slit arrays SA1, SA2 of the disc 110 are formed so as to have a pattern for the origin. Then, the bit pattern or intensity of the light reception signal from the light receiving arrays PA1, PA2 represents the position of the origin. In the absolute signal as in the embodiments described above, the signal intensity of each light receiving element is in charge of a bit representing the absolute position. As a result of this, the absolute signal is more susceptible to the influence of noise compared to the origin signal obtained as described above. Consequently, it is possible to more effectively reduce the influence of noise by using the light receiving arrays PA1, PA2 having the shape and arrangement as in the embodiments described above as those for absolute signal.

In the embodiments described above, the case is explained where the encoder 100 is connected directly to the shaft SH of the motor M. However, the arrangement position of the encoder 100 is not limited in particular to the example illustrated in the present embodiment. For example, the encoder 100 may be arranged so as to be connected directly to the output side of the shaft SH. Alternatively, the encoder 100 may be connected to the moving body, such as the shaft SH, via another mechanism, such as a decelerator and rotation direction converter. Further, the encoder 100 may be connected to the object to be moved (example of an object to be measured) itself, which is an object the position of which is controlled by the servo system S so as to detect the full-closed position. When detecting the full-closed position, it is desirable to arrange two or more encoders. As a result of this, it is possible to detect the position x of the motor M as well as detecting the position of the object to be moved. In this case, it is sufficient for at least one of the encoder that detects the position of the object to be moved and the encoder that detects the position x of the motor M to be the encoder 100 explained in detail in the embodiments described above. In that case, the same working and effect as those in the embodiments described above can be obtained even if another kind of encoder is used as the other of the above-mentioned two encoders.

What is claimed is:

1. An encoder comprising:
   a slit array comprising a plurality of reflection slits arranged side by side along a first measurement axis; and
   an optical module capable of relatively moving on said first measurement axis with respect to said slit array while facing part of said slit array,
   said optical module comprising:
   a point light source that irradiates the part of said slit array with light; and
   a light receiving array comprising a plurality of light receiving elements arranged side by side along a second measurement axis and arranged in positions offset with respect to said point light source in a width direction perpendicular to said second measurement axis corresponding to said first measurement axis in a plane parallel to said slit array, the light receiving elements being respectively receiving light irradiated from said point light source and reflected from said reflection slit, and
   said plurality of light receiving elements comprises respective shapes such that the light receiving element nearer to said point light source in said second measurement axis direction comprises a shorter length in said width direction and end parts on an opposite side of the light receiving element with respect to said point light source in said width direction are arranged side by side in positions along said second measurement axis.

2. The encoder according to claim 1, wherein:
   at least two of said slit arrays are arranged side by side in said width direction;
   said point light source is arranged facing a position between said two slit arrays arranged side by side; and
   at least two of said light receiving arrays are arranged side by side sandwiching said point light source in said width direction and facing said two slit arrays arranged side by side, respectively.

3. The encoder according to claim 2, wherein:

each of said two slit arrays arranged side by side comprises an absolute pattern along said first measurement axis direction;

in a position facing said point light source between said two slit arrays arranged side by side, at least one of said slit array comprising an incremental pattern is arranged; and on at least one of one side and the other side of said point light source in said second measurement axis direction, another light receiving array is arranged which receives reflection light from said at least one slit array and outputs an incremental signal.

4. The encoder according to claim 3, wherein:

a plurality of light receiving elements included in said another light receiving array that outputs said incremental signal comprises the same length along said width direction, respectively.

5. The encoder according to claim 2, wherein:

the light receiving elements of one of said two light receiving arrays arranged side by side and the light receiving elements of the other of said two light receiving arrays arranged side by side are formed such that the lengths thereof along said second measurement axis direction are substantially the same with each other, and the lengths thereof along said width direction are shorter in the light receiving elements nearer to said point light source in said second measurement axis direction and provide the substantially same amount of received light.

6. An optical module that configures an encoder when arranged so as to be capable of relatively moving on a first measurement axis with respect to a slit array while facing part of said slit array comprising a plurality of reflection slits arranged side by side along said first measurement axis, said optical module comprising:

a point light source that irradiates the part of said slit array with light; and a light receiving array comprising a plurality of light receiving elements arranged side by side along a second measurement axis and arranged in positions offset with respect to said point light source in a width direction perpendicular to said second measurement axis corresponding to said first measurement axis in a plane parallel to said slit array, the light receiving elements being respectively receiving light irradiated from said point light source and reflected from said reflection slit, wherein said plurality of light receiving elements comprises respective shapes such that the light receiving element nearer to said point light source in said second measurement axis direction comprises a shorter length in said width direction and end parts on an opposite side of the light receiving element with respect to said point light source in said width direction are arranged side by side in positions along said second measurement axis.

7. A servo system comprising:

a motor capable of moving an object to be moved in a first measurement axis direction;

an encoder that detects a position of at least one of said motor and said object to be moved, in said first measurement axis direction; and a controller that controls said motor based on the position detected by said encoder, said encoder including:

a slit array in which a plurality of reflection slits arranged side by side along said first measurement axis; and an optical module capable of relatively moving on said first measurement axis with respect to said slit array by a drive of said motor while facing part of said slit array, said optical module comprising:

a point light source that irradiates the part of said slit array with light; and a light receiving array comprising a plurality of light receiving elements arranged side by side along a second measurement axis and arranged in positions offset with respect to said point light source in a width direction perpendicular to said second measurement axis corresponding to said first measurement axis in a plane parallel to said slit array, the light receiving elements being respectively receiving light irradiated from said point light source and reflected from said reflection slit, and wherein said plurality of light receiving elements comprises respective shapes such that the light receiving element nearer to said point light source in said second measurement axis direction comprises a shorter length in said width direction and end parts on an opposite side of the light receiving element with respect to said point light source in said width direction are arranged side by side in positions along said second measurement axis.

\* \* \* \* \*